United States Patent Office 3,165,780
Patented Jan. 19, 1965

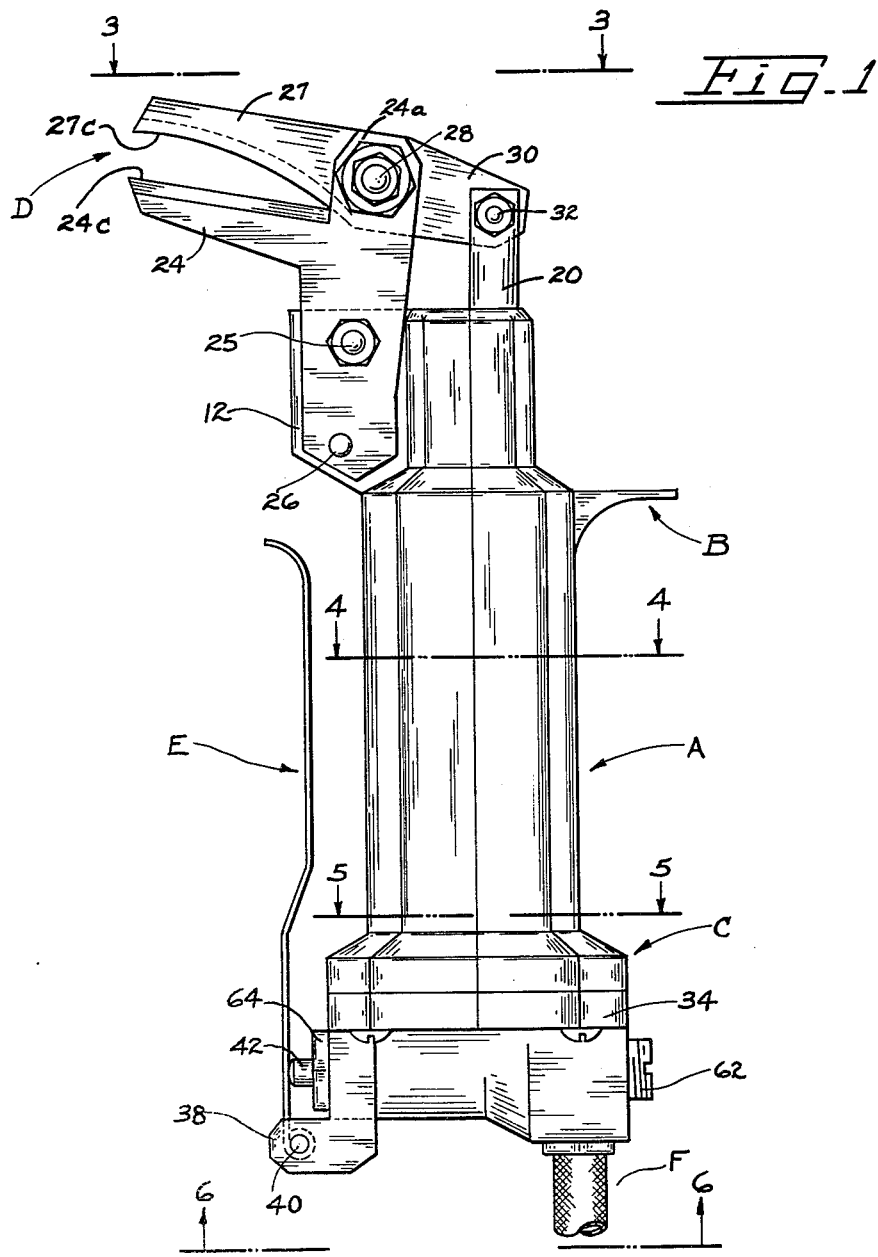

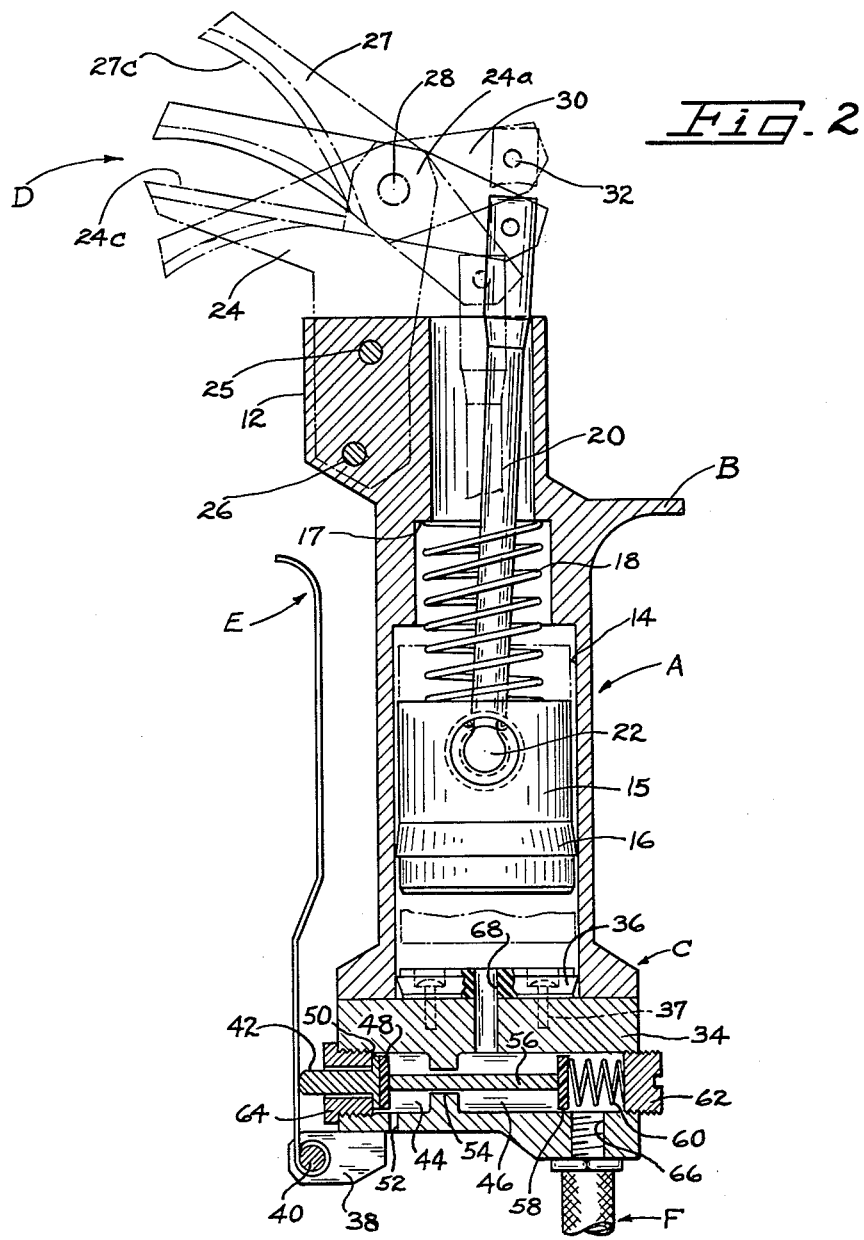

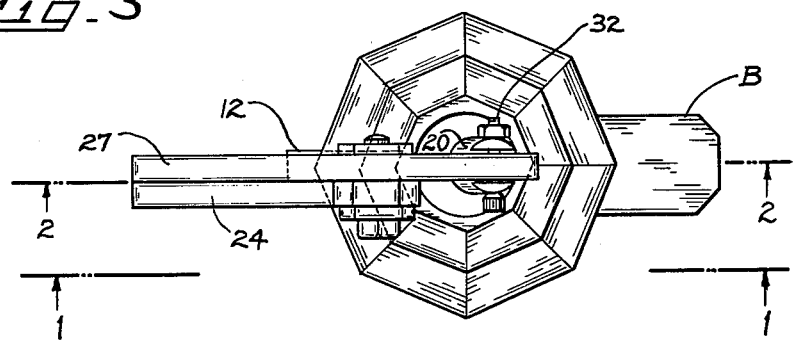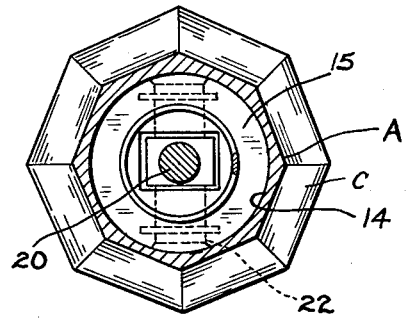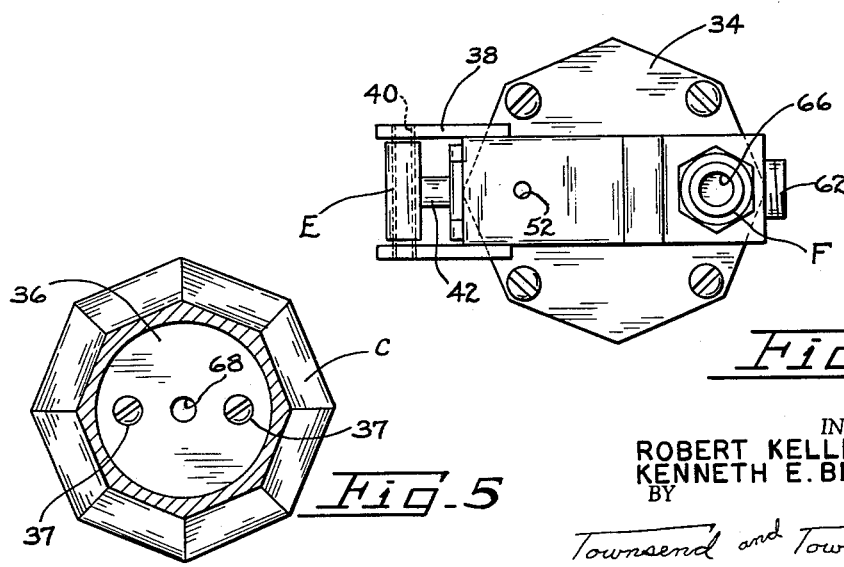

3,165,780
POULTRY NECK CUTTER
Robert Kellersman, Salem, Oreg., and Kenneth E. Belknap, Dinuba, Calif., assignors to Hydrahone Equipment Company, Milwaukee, Wis.
Filed Sept. 27, 1962, Ser. No. 226,495
1 Claim. (Cl. 17—12)

This invention relates to a poultry neck cutter and more particularly to a hand-held poultry neck cutter that is air driven.

During the preparation for marketing of large quantities of poultry such as chicken, turkeys and the like, it is necessary to remove the head from the neck of the fowl and also in many instances to remove the neck from the body of the fowl. The present invention concerns an air driven tool for cutting poultry necks during processing and includes in the embodiment shown in the drawings and described in detail herein below an elongated body forming a handgrip around which the operator's fingers can be encircled, a thumb-rest at one end of the body, a flange at the other end of the body spaced from the thumb-rest sufficiently to permit the operator to grasp the body between the thumb-rest and the flange, a pair of blades mounted on the same end of the body as the thumb-rest and extending normal to the body on the side of the body opposite the thumb-rest, a cylinder and piston within the body, a connecting rod between the piston and one of the blades to effect opening and closing of the blades, and a control valve with an operating handle that extends substantially along the surface of the body so that its operation is effected by simple closure of the operator's fingers.

A feature and advantage of the present invention is that a secure handgrip is formed between the thumb-rest and flange so that minimum muscular effort is required to support the cutter. Operator fatigue is thereby reduced; the thumb-rest rests on the thumb or on the web of the hand between the thumb and forefinger to permit support of the cutter in the hand with slight pressure by the fingers and thumb. Thus, the operating handle can be released and actuated expeditiously since minimal finger pressure is needed to support the cutter.

Another feature and advantage of this invention is that the blades of the cutter extend generally normal to the longitudinal axis of the body. Therefore, the tool can be conveniently used at approximately waist height without bending of the wrist and the fatigue consequent therefrom. Placement of the blades on a line generally normal to the longitudinal axis of the body also reduces the overall length of the cutter, thus making the cutter easier to handle and safer, in that the protruding blades are close to the hand of the operator.

Still another feature and advantage of the present invention resides in the provision of an air valve that extends transversely of the longitudinal axis of the cutter body; such construction makes possible a shortened cutter body, thereby making the device lighter and more convenient to use. Moreover, such positioning of the air control means permits an extremely simplified linkage between the air valve and the operator's hand.

Still another feature and advantage of the present invention is the provision of an improved air valve arrangement in an end cap of an air cylinder that simplifies the construction of the body that houses the cylinder. No complex passages or ducts are required to effect rapid and efficient operation of the cutter.

These and other objects, features and advantages will be more apparent after referring to the following specification and attached drawings in which FIG. 1 is an elevational side-view of the preferred embodiment of the present invention taken substantially along line 1—1 of FIG. 3;

FIG. 2 is an elevational side-view in cross-section of the embodiment of FIG. 1 taken substantially along line 2—2 of FIG. 3;

FIG. 3 is an end-view taken substantially along line 3—3 of FIG. 1;

FIG. 4 is a cross-sectional view of the body of a poultry cutter taken substantially along line 4—4 of FIG. 1;

FIG. 5 is a cross-sectional view taken substantially along line 5—5 of FIG. 1; and FIG. 6 is a bottom end-view taken substantially along line 6—6 of FIG. 1.

A poultry cutter of the present invention includes a handgrip formed by the exterior surface of a body A, a thumb-rest B at one end of the body and a flange C surrounding the body at the other end thereof spaced from thumb-rest B by an amount approximately equal to the width of the hand to enable the operator to grasp the body. At the upper or cutter end of body A a pair of blades D is provided. The blades are caused to close in shear by movement of an operating handle E toward body A by the fingers of the operator. Operating handle E controls compressed air fed to the cutter through an air hose F and is pivotally mounted to the body at the lower or air-input end thereof.

At one end of body A, a cutter mounting bracket 12 is provided generally perpendicular with the body. Bracket 12 is disposed approximately 180° around the body from thumb-rest B so that the blades D will extend in an opposite direction from the thumb-rest. Interior of body A is provided a cylindrical bore 14 and that is in axial alignment with the longitudinal axis of body A; mounted for reciprocal movement within bore 14 is a piston 15 provided with a sealing ring 16 of rubber or the like. A shoulder 17 supports one end of a compression spring 18, the other end of which bears against piston 15 to urge the piston downwardly. A connecting rod 20 is pivotally attached to piston 15 by means of a wrist-pin 22. Connecting rod 20 extends through spring 18 and at its opposite end is operatively connected to blades D.

Cutting blades D include a fixed blade 24 attached to bracket 12 by means of threaded members 25 and 26, and a movable blade 27 pivotally attached to blade 24 by a pin 28. Fixed blade 24 is provided with a protruding ear 24a for receipt of pin 28. Blade 24 has a cutting edge 24c that is generally normal to the longitudinal axis of body A. Perpendicularity with the axis is not required, and for the purposes of the present invention, generally normal is intended to include a perpendicular edge 24c or an edge disposed approximately 20° on either side of a perpendicular line. Blade 27 has a cutting edge 27c that is preferably concave. On the end of blade 27 remote from the edge 27c an arm 30 is formed with a hole for receipt of a pin 32 that pivotally attaches connecting rod 20 to movable blade 27. Thus, longitudinal movement of piston 15 through cylindrical bore 14 in body A causes cutting edge 27c to move toward and away from fixed cutting edge 24c. Spring 18 biases the blades in an open position. Open, closed and intermediate positions of blade 27 are shown in FIG. 2.

At the opposite end of body A an end cap 34 is provided for enclosing one end of cylindrical bore 14. A sealing member 36 of rubber or the like is provided on end cap 34 for making an air-tight seal at the lower end of cylindrical bore 14. At the extremity of end cap 34 a bifurcated bracket 38 is provided for receiving a pin 40 upon which one end of operating handle E is pivotally attached. Protruding radially from end cap 34 between furcations of bracket 38 is a plunger 42 that forms part of the valve for controlling the inflow of air to cylindrical bore 14 in body A. Plunger 42 communicates mechanical action from operating handle E to the valve interior.

The air valve is housed in an opening formed by coaxial cylindrical openings 44 and 46 which are formed normal to the longitudinal axis of body A and can be provided by drilling from opposite sides of end cap 34. Cylindrical opening 44 forms a bleed chamber and has a resilient sealing member 48 bearing against a flange 50 on the inner end of plunger 42. Communicating between the exterior of the device and cylindrical opening 44 is an air bleed hole 52. Communication between cylindrical chamber 44 and 46 is established through a passage 54. Bearing against resilient sealing member 48 is an operating rod 56 which bears against a second resilient sealing piston 58 in chamber 46; sealing piston 58 is biased by a spring 60 so as to prevent the passage of air through the valve unless the plunger 42 is moved inwardly. An end cap 62 is threadably mounted in the outer end of chamber 46 to support spring 60. An end cap 64 is threadably mounted on the exterior end of chamber 44 and is formed with a suitable hole for slidably supporting plunger 42. A passage 66 is provided in end cap 34 for admitting air into chamber 46 of the valve; a passage 68 is provided for communicating air from the valve into cylindrical bore 14.

In operation, with air supplied through hose F and operating handle E positioned as shown in FIG. 2 cutters D will be in an open position due to the action of spring 18 urging piston 15 downwardly in cylindrical bore 14. The device can conveniently be held in the hand without pressing the handle E, due to the grip formed between thumb-rest B and flange C. Although body A is shown in the drawings with a generally octagonal shape it is to be understood that this is only exemplary, and the body can be round, hexagonal, or any similar suitable shape that provides comfort to the hand of the operator. Because blades D are disposed generally normal to the longitudinal axis of the device, a poultry neck can be placed between the jaws D without bending the wrist of the hand that holds the device. When the neck is in place, the fingers are squeezed to move operating handle E in toward body A which action pivots the operating handle about pin 49 and moves plunger 42 inwardly, i.e., toward the right-hand side of FIG. 2. Such movement of plunger 42 also causes movement of resilient seal 58 to the right and therefore a path through passage 66, chamber 46 and passage 68 into cylindrical bore 14 is established. The air pressure acting on the end of piston 15 moves the piston against the pressure of spring 18 and cutting edge 27c of blade 27 is moved downward toward fixed cutting edge 24c. The poultry neck is thus sheared. Upon release of handle E, spring 60 urges sealing piston 58 to the left within cylinder 46 and flow of compressed air from hose F is interrupted. Air within bore 14 exhausts through passage 68, passage 54, chamber 44 and bleed hole 52, thus enabling spring 18 to move piston 15 downwardly. Jaws D open to prepare the device for another cutting stroke.

Operation of the air control valve along an axis normal to longitudinal axis of body A makes possible a relatively short light weight tool. A reduction in operator fatigue is thereby secured.

The blade mounting means used in the present invention is particularly advantageous in permitting rapid changing of one or both of the cutting blades without requiring extensive disassembly of the tool. Thus, if both blades are to be changed, removal of threaded members 25 and 26 and a pin 32 permit removal of both blades. On the other hand, should only the movable blade be changed, removal of pins 28 and 32 are sufficient.

While one embodiment of the present invention has been shown and described it will be apparent that other adaptations and modifications may be made without departing from the true spirit and scope of the invention.

What is claimed is:

A poultry neck cutter of the type adapted for hand-held operation comprising an elongate body, said body being adapted to be manually grasped by an operator by encirclement of the body by the fingers and thumb of one hand of the operator, a thumb rest adjacent one longitudinal end of the body, a flange circumscribing the body adjacent the other longitudinal end of the body, said flange being spaced from said thumb rest by an amount sufficient to permit manual grasping of the body between the flange and thumb rest, a fixed blade mounted on the body substantially opposite said thumb rest and extending generally normal to the longitudinal axis of the body, a movable blade pivotally mounted on said fixed blade, said fixed blade and said movable blade being adapted to cooperate to shear a poultry neck along a shear line generally normal to the longitudinal axis of the body means responsive to compressed air for pivoting said movable blade relative said fixed blade, said compressed air responsive pivoting means being housed within said body, means disposed proximate said flange for controllably supplying air to said compressed air responsive pivoting means, and an operating handle on said air supplying means, said operating handle being pivotally mounted proximate said flange and extending longitudinally along the outer surface of said body opposite said thumb rest, whereby closure of the fingers moves said operating handle to admit air into said pivoting means to cause closure of said movable blade toward said fixed blade.

References Cited in the file of this patent
UNITED STATES PATENTS

| Re. 21,347 | Goodman | Feb. 13, 1940 |
| 2,504,405 | Fletcher | Apr. 18, 1950 |
| 2,505,385 | Carnesecca | Apr. 25, 1950 |
| 2,631,369 | Carnesecca | Mar. 17, 1953 |
| 2,733,506 | Wild | Feb. 7, 1956 |